United States Patent [19]
Ko

[11] Patent Number: 5,429,336
[45] Date of Patent: Jul. 4, 1995

[54] WALL RACK HAVING A TURNABLE SUPPORT FRAME AND A PLASTIC BUSHING IN A PIVOT SEAT THEREOF

[76] Inventor: Hsiwng Chich Ko, No.131, Ting-Hsing Tsun, Shen-Kang Hsiang, Chang-Hua Hsien, Taiwan

[21] Appl. No.: 220,189

[22] Filed: Mar. 30, 1994

[51] Int. Cl.⁶ .............................................. E04G 3/00
[52] U.S. Cl. ..................................... 248/278; 248/282
[58] Field of Search ............. 248/921, 922, 923, 282, 248/283, 278, 280.1, 281.1, 279, 325, 323

[56] References Cited

U.S. PATENT DOCUMENTS

| | | | |
|---|---|---|---|
| 4,447,031 | 5/1984 | Souder | 248/281.1 X |
| 4,562,987 | 1/1986 | Leeds | 248/283 X |
| 4,607,897 | 8/1986 | Schwartz | 248/282 X |
| 4,687,167 | 8/1987 | Skalka | 248/921 X |
| 4,708,312 | 11/1987 | Rohr | 248/921 X |
| 4,836,486 | 6/1989 | Vossoughi | 248/280.1 X |
| 4,846,434 | 7/1989 | Krogsruo | 248/280.1 |
| 4,863,124 | 9/1989 | Ball | 248/282 X |
| 5,271,590 | 12/1993 | Rosen | 248/278 X |

*Primary Examiner*—J. Franklin Foss
*Attorney, Agent, or Firm*—Merchant, Gould, Smith, Edell, Welter & Schmidt

[57] ABSTRACT

A wall rack includes a wall mounting member and an extensible arm unit which has a first end pivoted to the wall mounting member and a second end formed with a pivot seat. A plastic bushing has a hollow cylindrical portion received tightly in the pivot seat. A support frame is disposed on the pivot seat. A pivot shaft connects the support frame to the plastic bushing and is received in the plastic bushing to permit rotation of the support frame about the axis of the pivot shaft with respect to the pivot seat.

9 Claims, 7 Drawing Sheets

WALL RACK HAVING A TURNABLE SUPPORT FRAME AND A PLASTIC BUSHING IN A PIVOT SEAT THEREOF

BACKGROUND OF THE INVENTION

1. Field of the Invention

This invention relates to a wall rack, more particularly to a wall rack with an extensible arm unit and a turnable support frame on which an article can be supported steadily.

2. Description of the Related Art

Figure 1:
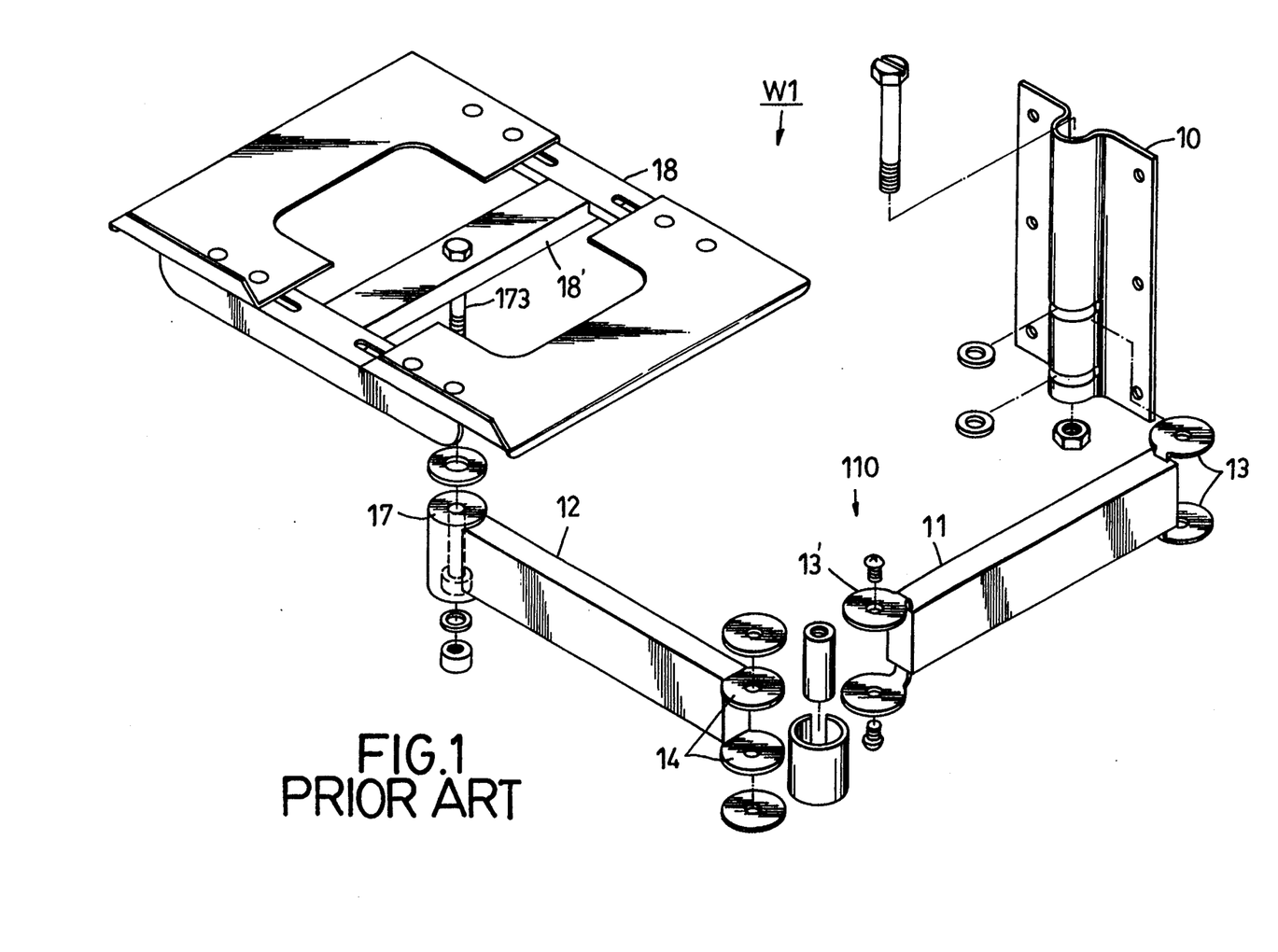
FIG. 1 is an exploded view of a conventional wall rack.

Referring to FIG. 1, a conventional wall rack (W1) includes a wall mounting member 10 which is to be attached to a wall, and an extensible arm unit 110 which has a first arm 11 and a second arm 12. The first arm 11 has a first end 13 pivoted to the wall mounting member 10 and a second end 13'. The second arm 12 has a first end 14 pivoted to the second end 13' of the first arm 11 and a second end formed with a pivot seat 17. A turnable support frame 18 is disposed on the pivot seat 17 and has a bar 18' for supporting an article, such as a television, thereon. A pivot shaft 173 passes through the bar 18' and is received in the pivot seat 17 in order to interconnect the bar 18' and the pivot seat 17 so as to permit rotation of the support frame 18 about the axis of the pivot shaft 173 with respect to the pivot seat 17. In this way, the article supported on the support frame 18 can be extended to a desired position and turned to an appropriate orientation by operating the arm unit 110 and the support frame 18. Generally, the pivot shaft 173 and the pivot seat 17 are made of metal and are liable to wear after a period of use. Thus, the worn-out pivot shaft 173 cannot be received steadily in the worn-out pivot seat 17, thereby resulting in vibration of the support frame 18. In this way, the article on the support frame 18 cannot be supported steadily. In addition, because the pivot seat 17 is formed integrally with the second arm 12, replacement of the worn-out pivot seat 17 is difficult and inconvenient to conduct. Therefore, the supporting effect provided by the conventional wall rack (W1) cannot be improved easily.

SUMMARY OF THE INVENTION

Therefore, the objective of this invention is to provide an improved wall rack that can support an article steadily thereon.

Another objective of this invention is to provide an improved wall rack which has an adjusting member to incline adjustably a support frame thereof.

Accordingly, a wall rack according to this invention includes a wall mounting member, and an extensible arm unit having a first end pivoted to the wall mounting member and a second end formed with a pivot seat. A plastic bushing has a hollow cylindrical portion received tightly in the pivot seat. A turnable support frame is disposed on the pivot seat. A pivot shaft connects the support frame to the plastic bushing and is received in the plastic bushing in order to permit rotation of the support frame about the axis of the pivot shaft with respect to the pivot seat.

The plastic bushing is made of a material having high abrasion-resistance, high strength and high toughness characteristics. The material may be nylon 66.

The cylindrical portion of the plastic bushing has a top part. The plastic bushing has a collar which extends radially from the top part to bear on a top end of the pivot seat. In addition, the support frame may have a bar and an adjusting member which is located between the bar and the pivot seat in order to permit inclination of the support frame relative to the pivot seat.

The bar of the support frame has a bottom and two opposite longitudinal sides. The adjusting member has a base disposed between the bottom of the bar and the collar of the plastic bushing. The base has two opposite longitudinal edges along the longitudinal sides of the bar, two opposite transverse edges and an intermediate portion between the transverse edges. The intermediate portion of the base has a through-hole. The pivot shaft passes through the through-hole in the intermediate portion and is received in the plastic bushing. The adjusting member has two opposite lugs which extend upwardly from the longitudinal edges of the base adjacent to one of the transverse edges to sandwich portions of the longitudinal sides of the bar. A pivot pin passes through and interconnects the opposite lugs and the bar. The adjusting member further has an adjustment screw which engages threadedly the base adjacent to another one of the transverse edges of the base and which has a top end bearing against the bottom of the bar. The adjustment screw is movable upwards and downwards in order to turn the bar about the pivot pin so as to adjust an angle between the bar and the base.

BRIEF DESCRIPTION OF THE DRAWINGS

Other features and advantages of the present invention will become apparent in the following detailed description of the preferred embodiments, with reference to the accompanying drawings, in which.

DETAILED DESCRIPTION OF THE PREFERRED EMBODIMENTS

In the detailed description of the preferred embodiments, it should be noted that like elements are indicated by the same reference numerals throughout the disclosure.

Figure 2:
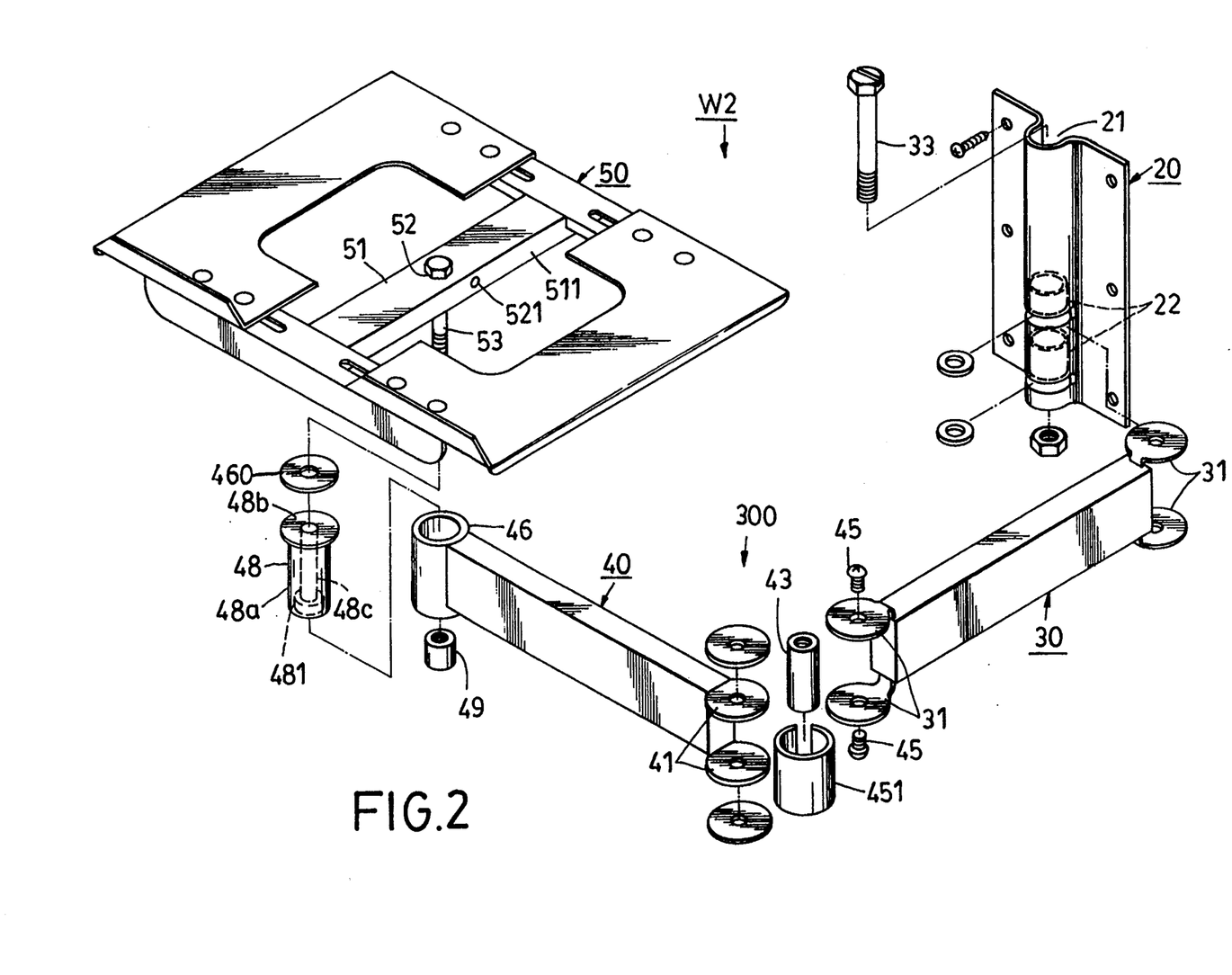
FIG. 2 is an exploded view of a first preferred embodiment of an improved wall rack of this invention.
Figure 3:
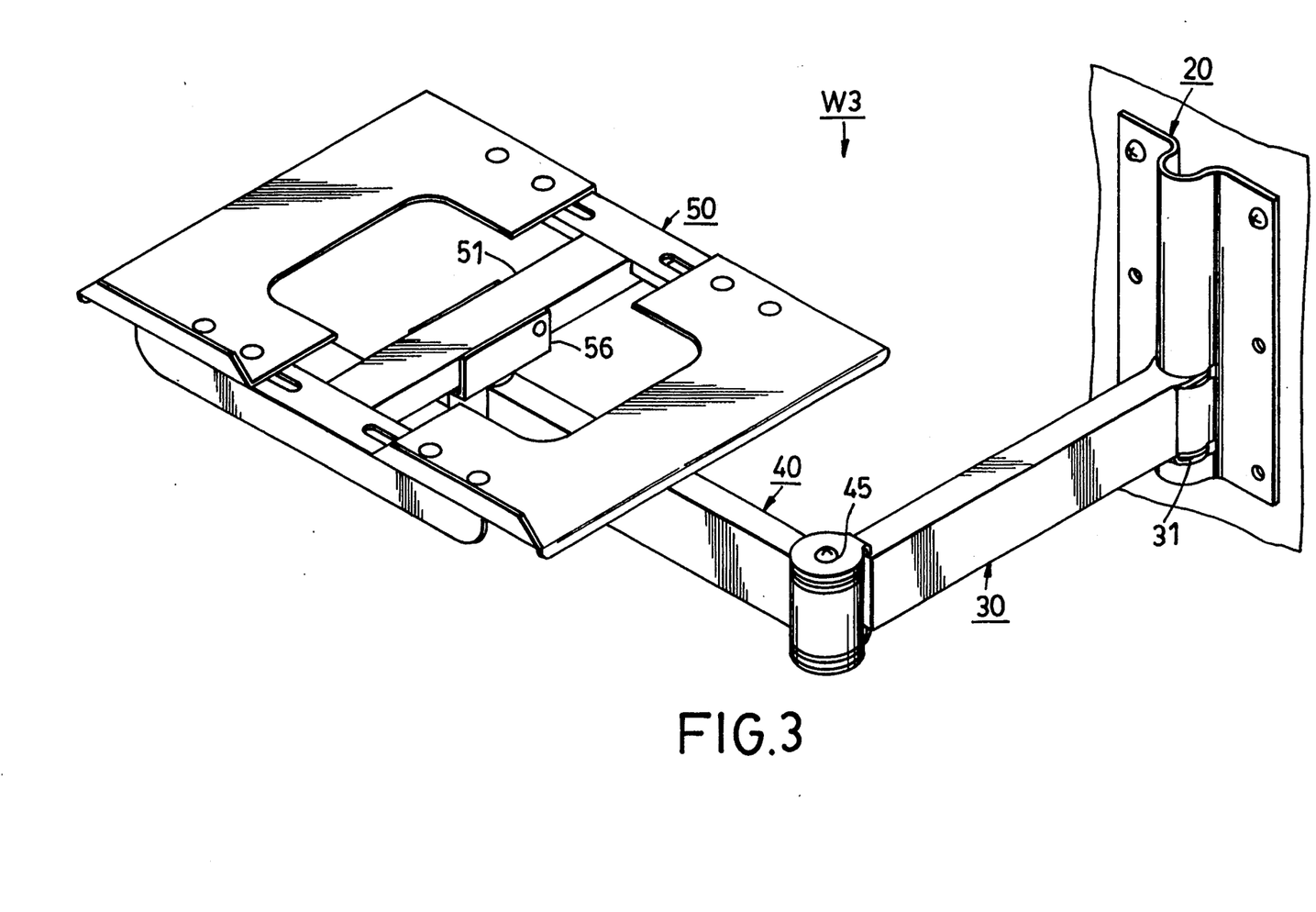
FIG. 3 is an assembled view of a second preferred embodiment of the improved wall rack.

FIG. 2 shows a first preferred embodiment of a wall rack (W2) according to this invention. The wall rack (W2) includes a wall mounting member 20 which is to be attached to a wall and which has a substantially U-shaped portion 21 having two aligned pivot seats 22. An extensible arm unit 300 has a first arm 30 and a second arm 40. The first arm 30 has a first end formed with two lugs 31 which are pivoted to the wall mounting member 20 by means of a pivot shaft 33 passing through the pivot seats 22 and the lugs 31. The first arm 30 further has a second end also formed with two lugs 31. The second arm 40 has a first end formed with two lugs 41 which are pivoted to the lugs 31 of the second end of the first arm 30 by means of a hollow shaft 43 and two screws 45. A C-shaped housing 451 is sleeved around the connected lugs 31, 41. The second arm 40 has a second end formed integrally with a pivot seat 46. The pivot seat 46 is formed as a hollow cylinder. A plastic bushing 48 has a hollow cylindrical portion (48a) which is received tightly in the pivot seat 46 and a collar (48b) which extends radially from a top part of the cylindrical portion (48a) to bear on a top end of the pivot seat 46. A through-hole (48c) in the plastic bushing 48 has an upper part and a lower part 481 which has a diameter larger than that of the upper part. The plastic bushing 48 is made of a material having high abrasion-resistance, high strength and high toughness characteristics. In the present invention, the plastic bushing 48 is made of nylon 66. In addition, the plastic bushing 48 can be detached from the pivot seat 46 by means of a tool. A washer 460 is disposed on the collar (48b) of the plastic bushing 48. A turnable support frame 50 for supporting an article (not shown), such as a television, thereon is disposed on the pivot seat 46. The support frame 50 has a bar 51 which has a bottom and two opposite longitudinal sides 511. The bottom of the bar 51 is located above the collar (48b) of the plastic bushing 48. A pivot shaft 53 passes through a through-hole 52 in the bar 51 and is received in the through-hole (48c) in the plastic bushing 48 in order to interconnect the bar 51 and the plastic bushing 48. An acorn nut 49 is received in the lower part 481 of the through-hole (48c) and engages a bottom end of the pivot shaft 53. In this way, the support frame 50 can rotate about the axis of the pivot shaft 53 with respect to the pivot seat 46. By operating the first and second arms 30, 40 and turning the support frame 50, the article on the support frame 50 can be disposed in a desired position and turned to a preferred orientation.

Since the plastic bushing 46 has high abrasion-resistance, high strength and high toughness characteristics, the pivot shaft 53 and the plastic bushing 48 do not easily wear during use. In addition, since the plastic bushing 48 is detachable from the pivot seat 46, replacement of the worn-out plastic bushing 48 is easier and more convenient to conduct than that of the worn-out pivot seat 17 in the conventional wall rack (W1). Thus, vibration of the support frame 50 due to the worn-out plastic bushing 48 can be minimized so that the article can be supported steadily on the support frame 50.

FIGS. 3 to 6 show a second preferred embodiment of the wall rack (W3) according to this invention. The wall rack (W3) has a structure similar to that of the wall rack (W2) in FIG. 2 and further has an adjusting member 56 located between the bar 51 and the pivot seat 46 in order to permit inclination of the support frame 50 relative to the pivot seat 46.

Figure 4:
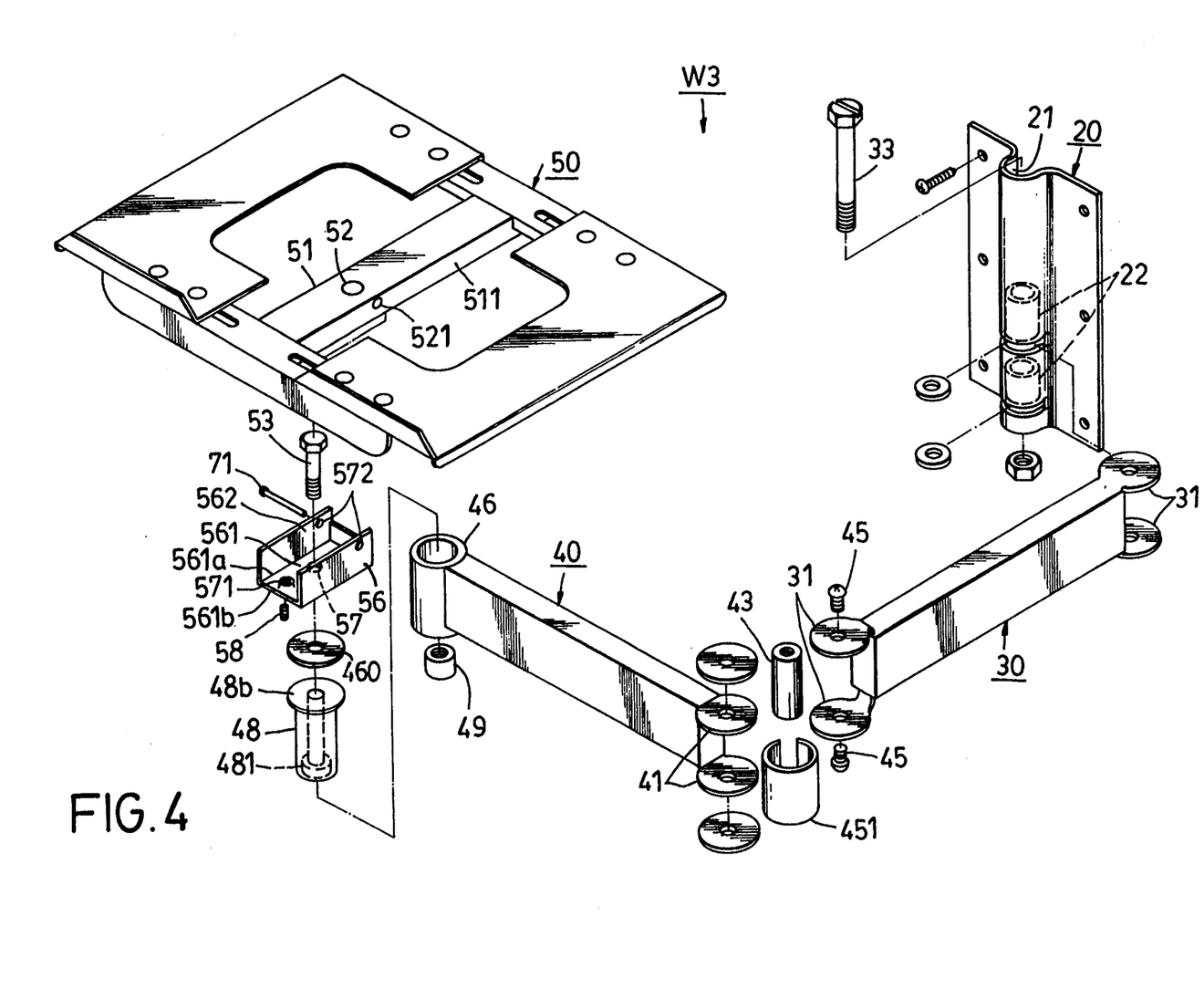
FIG. 4 is an exploded view of the second preferred embodiment.
Figure 5:
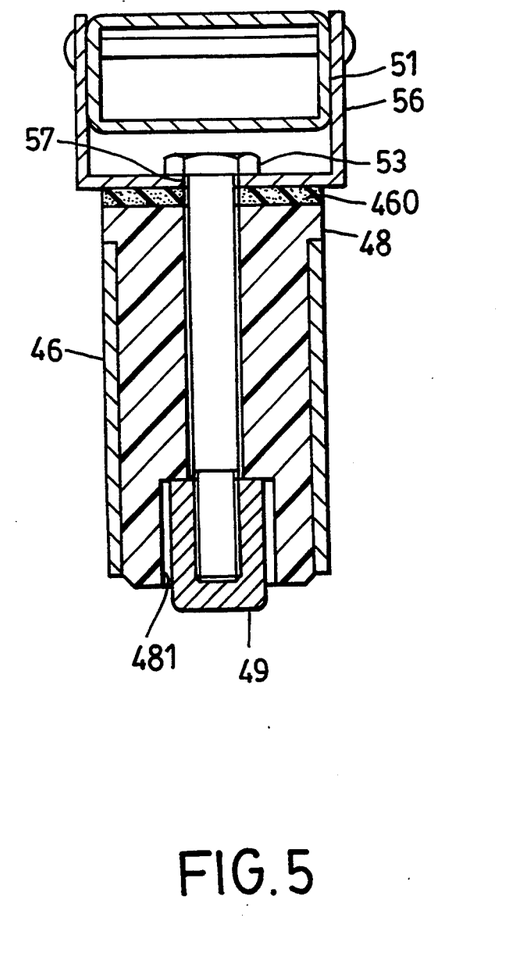
FIG. 5 is a partly sectional view of the second preferred embodiment showing the connection among a pivot shaft, an adjusting member and a pivot seat.
Figure 6:
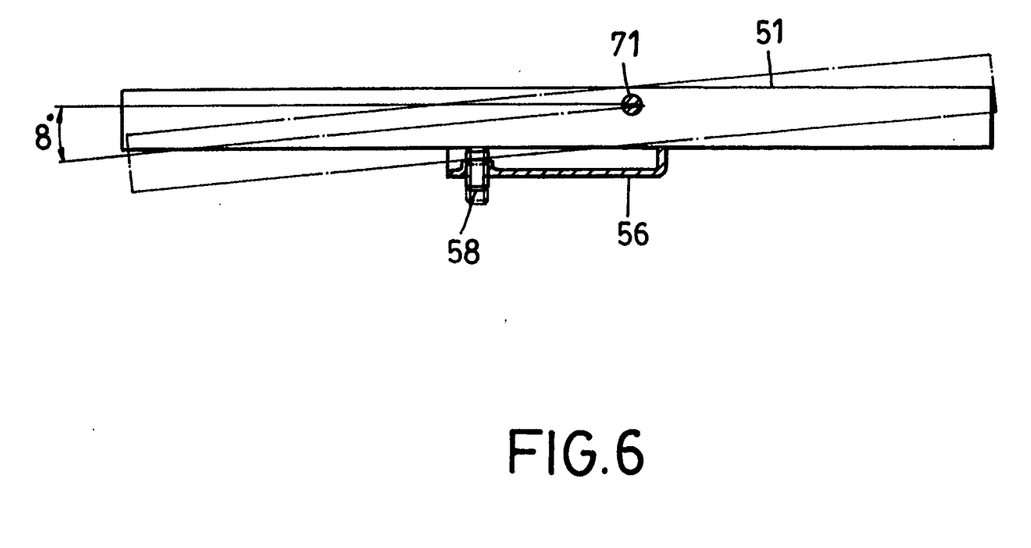
FIG. 6 is a schematic view showing a bar of a support frame of the second preferred embodiment.

Referring to FIG. 4, the adjusting member 56 has a base 561 disposed between the bottom of the bar 51 and the collar (48b) of the plastic bushing 48. The base 561 has two opposite longitudinal edges (561a) along the longitudinal sides 511 of the bar 51, two opposite transverse edges (561b) and an intermediate portion between the transverse edges (561b). The intermediate portion of the base 561 has a through-hole 57. The pivot shaft 53 passes through the through-hole 57 and is received in the plastic bushing 48 to permit rotation of the base 561 with respect to the plastic bushing 48. The adjusting member 56 has two opposite lugs 562 which extend upwardly from the longitudinal edges (561a) of the base 561 to sandwich portions of the longitudinal sides 511 of the bar 51. A pivot pin 71 passes through holes 572 of the lugs 562 and a through-hole 521 of the bar 51 to interconnect the lugs 562 and the bar 51 at a location adjacent to one of the transverse edges (561b) in order to permit turning of the bar 51 about the pivot pin 71. The adjusting member 56 further has an adjustment screw 58 which engages threadedly the base 561 adjacent to another one of the transverse edges (561b) of the base 561 and which has a top end bearing against the bottom of the bar 51. The adjustment screw 58 is movable upwards and downwards in order to turn the bar 51 about the pivot pin 71 so as to adjust an angle between the bar 51 and the base 561. Referring again to FIG. 6, the bar 51 inclines downward by an angle of about 8 degrees relative to the base 561 of the adjusting member 56 when the adjustment screw 58 is moved downwards.

The adjustment screw 58 has an axially extending through-hole confined by a hexagonal inner wall. Thus, upward and downward movement of the adjustment screw 58 relative to the base 561 can be accomplished with the use of a hex wrench.

During use, a television can be supported on the support frame 50 to turn to a preferred orientation by turning the base 561 with respect to the plastic bushing 48, and can be inclined at a desired angle due to the provision of the adjusting member 56.

Figure 7:
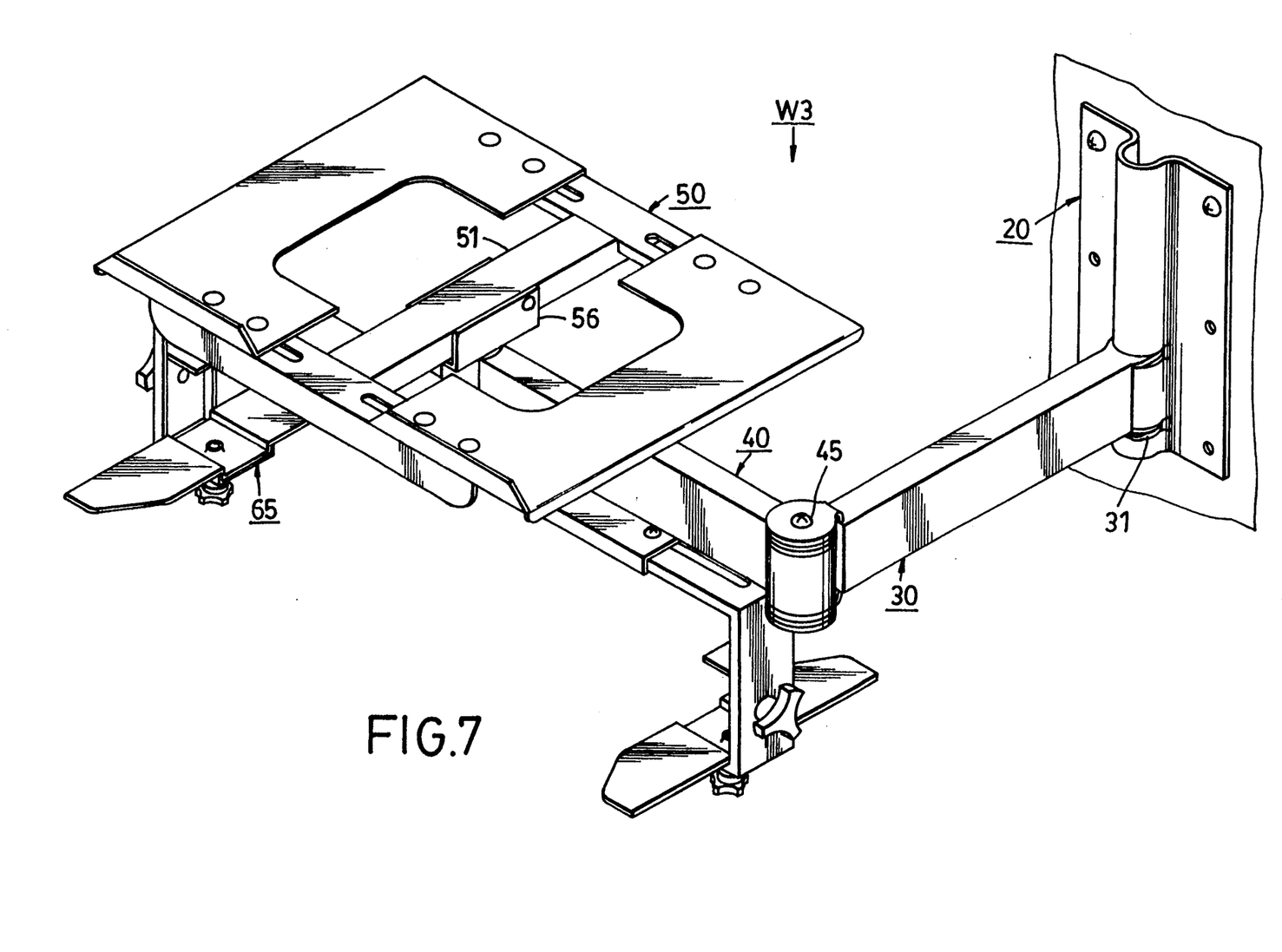
FIG. 7 is a perspective view of the second preferred embodiment when associated with a holding frame.

Referring to FIG. 7, the support frame 50 can be further mounted with a holding frame 65 in order to hold a videocassette recorder thereon.

While the present invention has been described in connection with what is considered the most practical and preferred embodiment, it is understood that this invention is not limited to the disclosed embodiments but is intended to cover various arrangements included within the spirit and scope of the broadest interpretations and equivalent arrangements.

I claim:
1. A wall racks, comprising:
   a wall mounting member;
   an extensible arm unit having a first end pivoted to said wall mounting member and a second end formed with a pivot seat;
   a turnable support frame disposed on said pivot seat;
   a pivot shaft connecting said support frame to said pivot seat and being received in said pivot seat to permit rotation of said support frame about the axis of said pivot shaft with respect to said pivot seat; and
   a plastic bushing having a hollow cylindrical portion which is detachably received tightly in said pivot seat and which is sleeved around said pivot shaft.

2. A wall rack as claimed in claim 1, wherein said pivot seat has a top end, said cylindrical portion of said plastic bushing having a top part, said plastic bushing further having a collar extending radially from said top part of said cylindrical portion to bear on said top end of said pivot seat.

3. A wall rack as claimed in claim 2, wherein said support frame has a bar and an adjusting member located between said bar and said pivot seat to permit inclination of said support frame relative to said pivot seat.

4. A wall rack as claimed in claim 3, wherein said bar of said support frame has a bottom and two opposite longitudinal sides, said adjusting member having a base disposed between said bottom of said bar and said collar of said plastic bushing, said base having two opposite longitudinal edges along said longitudinal sides of said bar, two opposite transverse edges and an intermediate portion between said transverse edges, said intermediate portion of said base having a through-hole, said pivot shaft passing through said through-hole in said intermediate portion and being received in said plastic bushing, said adjusting member having two opposite lugs which extend upwardly from said longitudinal edges of said base adjacent to one of said transverse edges to sandwich portions of said longitudinal sides of said bar, and a pivot pin passing through and interconnecting said opposite lugs and said bar, said adjusting member further having an adjustment screw which engages threadedly said base adjacent to another one of said transverse edges of said base and which has a top end bearing against said bottom of said bar, said adjustment screw being movable upwards and downwards to turn said bar about said pivot pin so as to adjust an angle between said bar and said base.

5. A wall rack as claimed in claim 1, wherein said plastic bushing is made of a material having high abrasion-resistance, high strength and high toughness characteristics.

6. A wall rack as claimed in claim 5, wherein said plastic bushing is made of nylon 66.

7. A wall rack, comprising:
  a wall mounting member;
  an extensible arm unit having a first end pivoted to said wall mounting member and a second end formed with a pivot seat;
  a turnable support frame disposed on said pivot seat;
  a pivot shaft connecting said support frame to said pivot seat and being received in said pivot seat to permit rotation of said support frame about the axis of said pivot shaft with respect to said pivot seat;
  a plastic bushing having a hollow cylindrical portion which is received tightly in said pivot seat and which is sleeved around said pivot shaft;
  wherein said pivot seat has a top end, said cylindrical portion of said plastic bushing having a top part, said plastic bushing further having a collar extending radially from said top part of said cylindrical portion to bear on said top end of said pivot seat;
  wherein said support frame has a bar and an adjusting member located between said bar and said pivot seat to permit inclination of said support frame relative to said pivot seat; and
  wherein said bar of said support frame has a bottom and two opposite longitudinal sides, said adjusting member having a base disposed between said bottom of said bar and said collar of said plastic bushing, said base having two opposite longitudinal edges along said longitudinal sides of said bar, two opposite transverse edges and an intermediate portion between said transverse edges, said intermediate portion of said base having a through-hole, said pivot shaft passing through said through-hole in said intermediate portion and being received in said plastic bushing, said adjusting member having two opposite lugs which extend upwardly from said longitudinal edges of said base adjacent to one of said transverse edges to sandwich portions of said longitudinal sides of said bar, and a pivot pin passing through and interconnecting said opposite lugs and said bar, said adjusting member further having an adjustment screw which engages threadedly said base adjacent to another one of said transverse edges of said base and which has a top end bearing against said bottom of said bar, said adjustment screw being movable upwards and downwards to turn said bar about said pivot pin so as to adjust an angle between said bar and said base.

8. A wall rack as claimed in claim 7, wherein said plastic bushing is made of a material having high abrasion-resistance, high strength and high toughness characteristics.

9. A wall rack as claimed in claim 8, wherein said plastic bushing is made of nylon 66.

* * * * *